United States Patent
Liu et al.

(10) Patent No.: US 10,420,137 B2
(45) Date of Patent: Sep. 17, 2019

(54) SYSTEM AND METHOD FOR SIGNAL DENSITY REDUCTION IN THE FREQUENCY DOMAIN

(71) Applicant: Futurewei Technologies, Inc., Plano, TX (US)

(72) Inventors: Bin Liu, San Diego, CA (US); Yanliang Sun, Beijing (CN); Kai Xu, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/708,284

(22) Filed: Sep. 19, 2017

(65) Prior Publication Data

US 2018/0098346 A1 Apr. 5, 2018

Related U.S. Application Data

(60) Provisional application No. 62/402,743, filed on Sep. 30, 2016.

(51) Int. Cl.
*H04W 72/12* (2009.01)
*H04B 7/06* (2006.01)
(Continued)

(52) U.S. Cl.
CPC ........ *H04W 72/1289* (2013.01); *H04B 7/066* (2013.01); *H04B 7/0626* (2013.01); *H04L 5/005* (2013.01); *H04L 5/0048* (2013.01); *H04L 5/0091* (2013.01); *H04W 72/042* (2013.01); *H04W 72/0446* (2013.01); *H04L 5/0023* (2013.01); *H04L 5/0035* (2013.01)

(58) Field of Classification Search
CPC ........... H04W 72/1289; H04W 72/042; H04W 72/0446; H04L 5/005; H04L 5/0091; H04L 5/0048; H04L 5/0023; H04L 5/0035; H04B 7/0626; H04B 7/066
See application file for complete search history.

(56) References Cited

U.S. PATENT DOCUMENTS

| | | |
|---|---|---|
| 2010/0080154 A1 | 4/2010 | Noh et al. |
| 2013/0294333 A1 | 11/2013 | Chen et al. |

(Continued)

FOREIGN PATENT DOCUMENTS

| | | |
|---|---|---|
| CN | 103428775 A | 12/2013 |
| CN | 103428777 A | 12/2013 |
| WO | 2016039586 A1 | 3/2016 |

OTHER PUBLICATIONS

Samsung et al., "WF on Aperiodic CSI-RS for Rel.14", 3GPP TSG RAN WG1 Meeting #86, R1-168046, Aug. 22-26, 2016, 6 pages, Gothenburg, Sweden.

*Primary Examiner* — Afshawn M Towfighi
(74) *Attorney, Agent, or Firm* — Slater Matsil, LLP

(57) ABSTRACT

A method for operating an access node includes sending, to a user equipment (UE), a frequency domain density reduction rate indicator and a frequency shift index indicator for one or more channel state indicator reference signal (CSI-RS) resources, wherein the frequency domain density reduction rate indicator indicates a number of physical resource blocks (PRBs) skipped between successive CSI-RS transmissions and the frequency shift index indicator indicates a shift of a CSI-RS starting PRB.

20 Claims, 7 Drawing Sheets

(51) Int. Cl.
*H04L 5/00* (2006.01)
*H04W 72/04* (2009.01)

(56) References Cited

U.S. PATENT DOCUMENTS

2016/0050050 A1   2/2016  Kang et al.
2017/0202014 A1*  7/2017  Moon .................. H04B 7/0626
2017/0222768 A1   8/2017  Lee et al.

* cited by examiner

| FREQUENCY DOMAIN DENSITY REDUCTION RATE INDICATION | CSI-RS TRANSMISSION FREQUENCY |
|---|---|
| 0 | EVERY PRB |
| 1 | EVERY OTHER PRB |
| 2 | EVERY TWO PRBS |
| 3 | EVERY THREE PRBS |

# SYSTEM AND METHOD FOR SIGNAL DENSITY REDUCTION IN THE FREQUENCY DOMAIN

This application claims the benefit of U.S. Provisional Application No. 62/402,743, filed on Sep. 30, 2016, entitled "Frequency Domain Density Reduction of Aperiodic CSI-RS in Enhanced Full Dimension MIMO in LTE," which application is hereby incorporated herein by reference.

TECHNICAL FIELD

The present disclosure relates generally to a system and method for digital communications, and, in particular embodiments, to a system and method for signal density reduction in the frequency domain.

BACKGROUND

Reference signals are transmitted by a first communications device to allow a second communications device receiving the reference signals to make measurements of the channel, obtain synchronization, and so on, based on the received reference signals. Therefore reference signals are crucial to the operation of the communications system. However, the transmission of reference signals consumes valuable network resources, thereby increasing communications overhead. Therefore, there is a need for systems and methods for reducing the network resources consumed in transmitting reference signals, and decreasing communications overhead.

SUMMARY

Example embodiments provide a system and method for signal density reduction in the frequency domain.

In accordance with an example embodiment, a method for operating an access node is provided. The method includes sending, by the access node to a user equipment (UE), a frequency domain density reduction rate indicator and a frequency shift index indicator for one or more channel state indicator reference signal (CSI-RS) resources, wherein the frequency domain density reduction rate indicator indicates a number of physical resource blocks (PRBs) skipped between successive CSI-RS transmissions and the frequency shift index indicator indicates a shift of a CSI-RS starting PRB.

Optionally, in any of the preceding embodiments, wherein the frequency domain density reduction rate indicator and the frequency shift index indicator are sent during a radio resource control (RRC) configuration stage of a CSI-RS resource configuration process.

Optionally, in any of the preceding embodiments, wherein a distinct frequency domain density reduction rate indicator and a distinct frequency shift index indicator are configured for each CSI-RS resource in an active set of CSI-RS resources.

Optionally, in any of the preceding embodiments, wherein the frequency domain density reduction rate indicator and the frequency shift index indicator are configured for each CSI-RS resource in an active set of CSI-RS resources.

Optionally, in any of the preceding embodiments, wherein a distinct frequency domain density reduction rate indicator and a distinct frequency shift index indicator are configured for each subset of CSI-RS resources in an active set of CSI-RS resources.

Optionally, in any of the preceding embodiments, wherein the frequency domain density reduction rate indicator and the frequency shift index indicator are sent during an activation/release stage of a CSI-RS resource configuration process, where one or more CSI-RS resources are selected from an active set of CSI-RS resources.

Optionally, in any of the preceding embodiments, wherein the frequency domain density reduction rate indicator and the frequency shift index indicator are sent in downlink control information (DCI).

Optionally, in any of the preceding embodiments, wherein the frequency shift index is relative to a first PRB of scheduled downlink resource blocks for the UE.

Optionally, in any of the preceding embodiments, wherein the frequency shift index is relative to a full band boundary.

In accordance with an example embodiment, a method for operating a UE is provided. The method includes receiving, by the UE from an access node, a frequency domain density reduction rate indicator and a frequency shift index indicator for one or more CSI-RS resources, wherein the frequency domain density reduction rate indicator indicates a number of PRBs skipped between successive CSI-RS transmissions and the frequency shift index indicator indicates a shift of a CSI-RS starting PRB, and sending, by the UE, one or more CSI-RSs in accordance with the frequency domain density reduction rate indicator and the frequency shift index indicator.

Optionally, in any of the preceding embodiments, wherein the frequency domain density reduction rate indicator and the frequency shift index indicator are sent during a RRC configuration stage of a CSI-RS resource configuration process.

Optionally, in any of the preceding embodiments, wherein a distinct frequency domain density reduction rate indicator and a distinct frequency shift index indicator are configured for each CSI-RS resource in an active set of CSI-RS resources.

Optionally, in any of the preceding embodiments, wherein the frequency domain density reduction rate indicator and the frequency shift index indicator are configured for every CSI-RS resource in an active set of CSI-RS resources.

Optionally, in any of the preceding embodiments, wherein a distinct frequency domain density reduction rate indicator and a distinct frequency shift index indicator are configured for each subset of CSI-RS resources in an active set of CSI-RS resources.

Optionally, in any of the preceding embodiments, wherein the frequency domain density reduction rate indicator and the frequency shift index indicator are sent during an activation/release stage of a CSI-RS resource configuration process, wherein one or more CSI-RS resources is selected from an active set of CSI-RS resources.

Optionally, in any of the preceding embodiments, wherein the frequency domain density reduction rate indicator and the frequency shift index indicator are sent in DCI.

In accordance with an example embodiment, an access node is provided. The access node includes one or more processors, and a computer readable storage medium storing programming for execution by the one or more processors. The programming including instructions to configure the access node to send, to a UE, a frequency domain density reduction rate indicator and a frequency shift index indicator for one or more CSI-RS resources, wherein the frequency domain density reduction rate indicator indicates a number of PRBs skipped between successive CSI-RS transmissions and the frequency shift index indicator indicates a shift of a CSI-RS starting PRB.

Optionally, in any of the preceding embodiments, wherein the programming includes instructions to configure the access node to send the frequency domain density reduction rate indicator and the frequency shift index indicator during a RRC configuration stage of a CSI-RS resource configuration process.

Optionally, in any of the preceding embodiments, wherein the programming includes instructions to configure the access node to send the frequency domain density reduction rate indicator and the frequency shift index indicator during an activation/release stage of a CSI-RS resource configuration process, where one or more CSI-RS resources are selected from an active set of CSI-RS resources.

Optionally, in any of the preceding embodiments, wherein the programming includes instructions to configure the access node to send the frequency domain density reduction rate indicator and the frequency shift index indicator in DCI.

In accordance with an example embodiment, a UE is provided. The UE includes one or more processors, and a computer readable storage medium storing programming for execution by the one or more processors. The programming including instructions to configure the UE to receive a frequency domain density reduction rate indicator and a frequency shift index indicator for one or more CSI-RS resources, wherein the frequency domain density reduction rate indicator indicates a number of PRBs skipped between successive CSI-RS transmissions and the frequency shift index indicator indicates a shift of a CSI-RS starting PRB, and send one or more CSI-RSs in accordance with the frequency domain density reduction rate indicator and the frequency shift index indicator.

Optionally, in any of the preceding embodiments, wherein the programming includes instructions to configure the UE to receive the frequency domain density reduction rate indicator and the frequency shift index indicator during a RRC configuration stage of a CSI-RS resource configuration process.

Optionally, in any of the preceding embodiments, wherein the programming includes instructions to configure the UE to receive the frequency domain density reduction rate indicator and the frequency shift index indicator during an activation/release stage of a CSI-RS resource configuration process, where one or more CSI-RS resources are selected from an active set of CSI-RS resources.

Optionally, in any of the preceding embodiments, wherein the programming includes instructions to configure the UE to receive the frequency domain density reduction rate indicator and the frequency shift index indicator in DCI.

Practice of the foregoing embodiments enables a reduction in the network resources used to transmit reference signals, such as the channel state information reference signal (CSI-RS), by reducing the density of the reference signals in the frequency domain.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figures 1, 4:
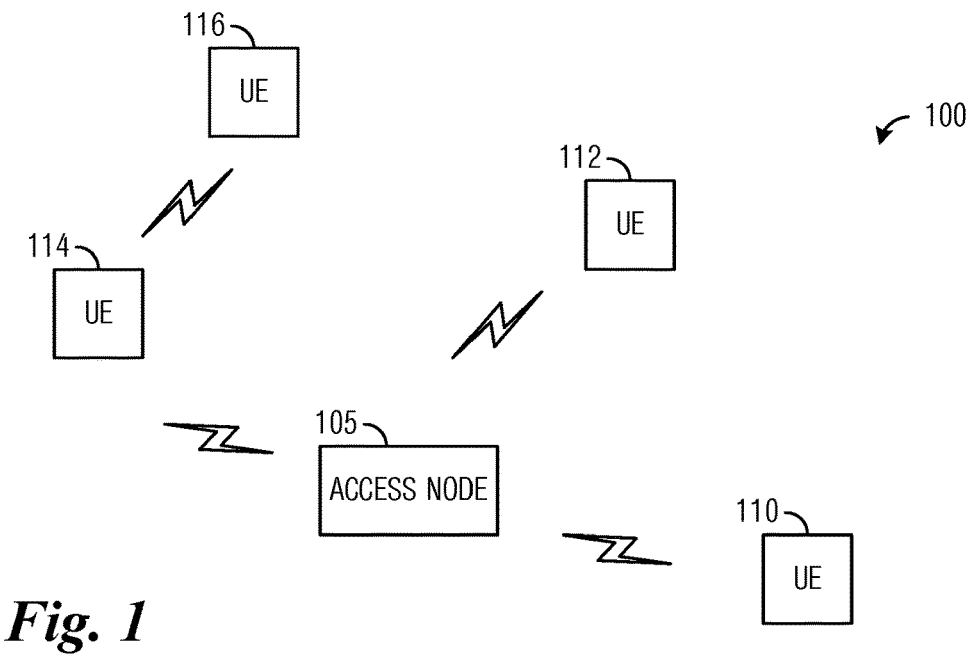
FIG. 1 illustrates an example communications system according to example embodiments described herein.
FIG. 4 illustrates an example table of frequency domain density reduction information according to example embodiments described herein.

FIG. 1 illustrates an example communications system 100. Communications system 100 includes an access node 105 serving a plurality of user equipments (UEs), including UEs 110, 112, 114, and 116. In a cellular operating mode, communications to and from the plurality of UEs go through access node 105, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, and so on, while UEs may also be commonly referred to as mobile stations, mobiles, terminals, users, subscribers, stations, and the like.

While it is understood that communications systems may employ multiple access nodes capable of communicating with a number of UEs, only one access nodes, and a number of UEs are illustrated for simplicity.

In modern communications systems, such as those that are Third Generation Partnership Project (3GPP) Long Term Evolution (LTE) compliant, reference signals are transmitted by a first communications device to allow a second communications device to use a received version of the reference signals to measure the channel, obtain synchronization, and so forth. Using 3GPP LTE technology and terminology, downlink reference signals include cell specific reference signals (CRS), UE-specific reference signals, multicast-broadcast single-frequency network (MBSFN) reference signals, position reference signals (PRS), and channel state information reference signals (CSI-RS), while uplink reference signals include demodulation reference signals (DM-RS) and sounding reference signals (SRS). Although 3GPP LTE technology and terminology is used in the discussion presented herein, the example embodiments are operable with other types of reference signals. Therefore, the use of 3GPP LTE technology and terminology should not be construed as being limiting to the spirit or the scope of the example embodiments.

In 3GPP LTE Release 14 (Rel-14), an aperiodic CSI-RS is presented to support class B enhanced multiple input multiple output (eMIMO) operation to reduce CSI-RS overhead in downlink transmission. In aperiodic CSI-RS operation, a specified number K of CSI-RS resources are configured for a UE and then a subset N of the K CSI-RS resources are activated per CSI process, with the N CSI-RS resource remaining active until released.

In the 3GPP RAN1 #86 meeting, it was agreed that overhead reduction for both periodic and aperiodic CSI-RS is warranted. It was also agreed that frequency domain density reduction for the CSI-RS for class B enhanced multiple input multiple output (eFD-MIMO) is to be supported, with an exact mechanism being for future study. Frequency domain density reduction to be supported may be expressible as:

All antenna ports of a CSI-RS resource configuration can be transmitted every N physical resource blocks (PRBs), If N=1, the existing CSI-RS design results, with N=1, 2, >2.

Figure 2:
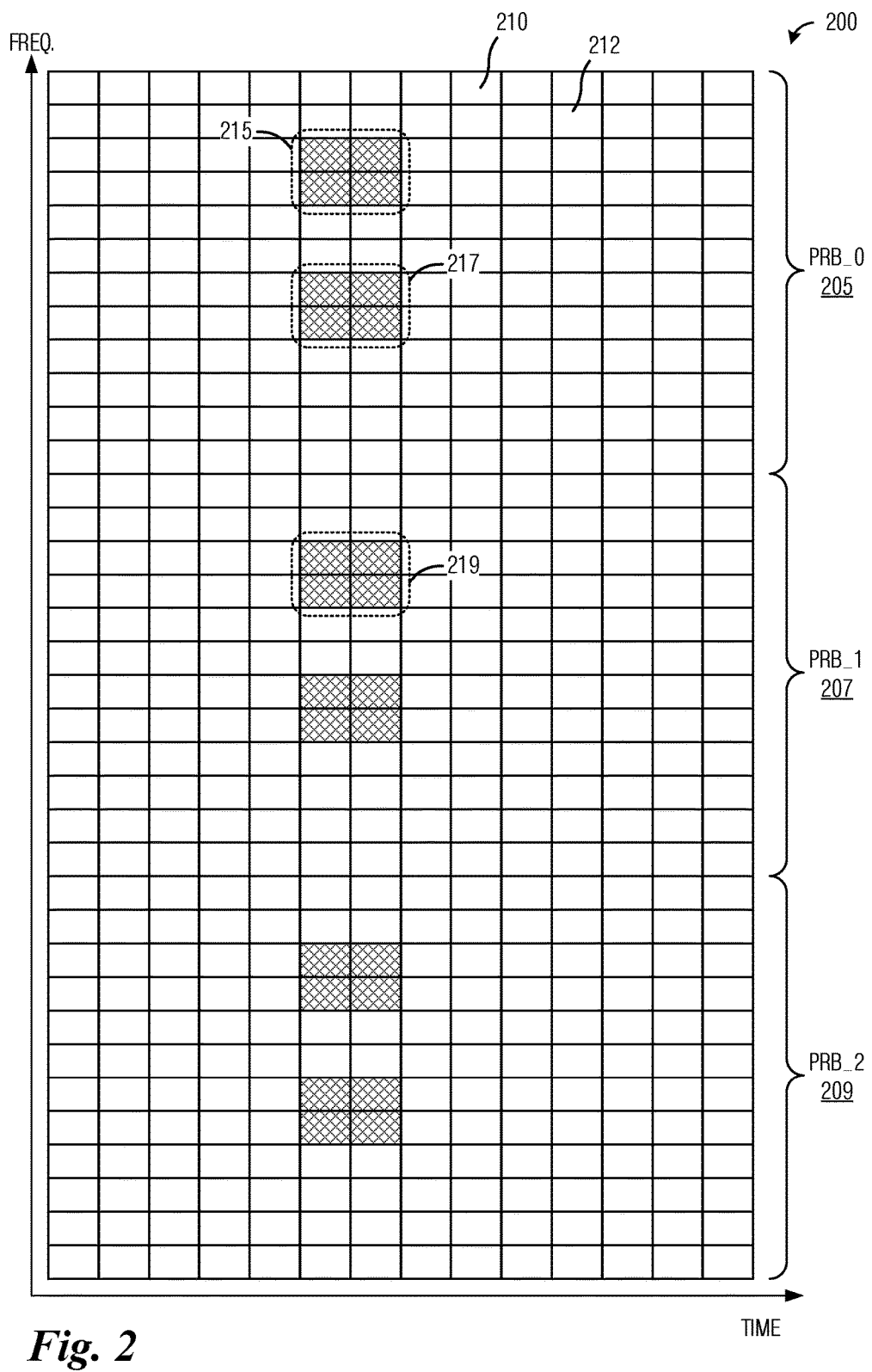
FIG. 2 illustrates a diagram of resource elements (REs) of three consecutive PRBs, highlighting an example existing CSI-RS design.

FIG. 2 illustrates a diagram 200 of resource elements (REs) of three consecutive PRBs, highlighting an example existing CSI-RS design. Diagram 200 displays three PRBs 205, 207, and 209. Each PRB comprises 14 time resources with each time slot comprising 12 frequency resources. A particular time-frequency resource is referred to as a resource element (RE), such as REs 210 and 212 of PRB_0 205. As shown in FIG. 2, some of the REs of the PRBs may be allocated as CSI-RS resources, including RE groups 215, 217, and 219, for example. In the example existing CSI-RS design shown in FIG. 2, the same RE groups of each PRB are allocated as CSI-RS resources.

Also in the 3GPP RAN1 #86 meeting, non-zero power (NZP) CSI-RS resources for aperiodic CSI-RS are configured in a two-step process, including:

Step 1: a radio resource control (RRC) configuration stage with a newly defined aperiodic CSI-RS resource configuration information element (IE) CSI-RS-Resource-Config that is without a subframe configuration and is used to configure a UE with an active set of K CSI-RS resources that may be used by the UE to receive one or more CSI-RSs, where K={1, 2, . . . , 8};

Step 2: an activation/release stage utilizing a mechanism to activate N out of the K CSI-RS resources of the active set per CSI process to receive the one or more CSI-RSs, with N being less than or equal to K. In other words, activation informs a UE which N out of the K CSI-RS resources from the active set will be used to convey the one or more CSI-RSs. Uplink grants and/or medium access control (MAC) control elements (CE) may be used as mechanisms in the activation/release stage. After activation, the activated CSI-RS resources may be released, using either uplink grants and/or MAC CEs, for example. Releasing the CSI-RS resources returns them to the active set, allowing them to be used at a later time if needed.

It is noted that one out of the N CSI-RS resources is selected via an uplink-related downlink control information (DCI). The uplink grant conveys a CSI request and indicates the transmission of one CSI-RS resource if more than one (i.e., N>1) aperiodic CSI-RS resources are activated for a CSI process for which the CSI is requested. A CSI request is for one CSI-RS resource per CSI process. Any one of the following presented techniques for indicating the transmission of one out of N CSI-RS resources is possible:

Technique 1: Code points from an existing DCI field is used to selected one out of N CSI-RS resources; or Technique 2: Additional bit(s) is added to the DCI.

It is noted that the number of DCI fields and the number of code points for the combinations of CSI process, component carrier (CC), and CSI-RS resource indication are for future study.

Additionally, in the 3GPP RAN1 #86 meeting, NZP CSI-RS resources for multi-shot CSI-RS are configured in a two-step process, including:

Step 1: RRC configuration stage with a 3GPP LTE Release 13 (Rel-13) periodic CSI-RS resource configuration IE CSI-RS-Resource-Config that configures a UE with an active set of K CSI-RS resources that may be used by the UE to receive one or more CSI-RSs, where K={1, 2, . . . , 8};

Step 2: an activation/release stage utilizing a mechanism to activate N out of the K CSI-RS resources of the active set CSI process to receive the one or more CSI-RSs, with N being less than or equal to K. It is noted that activation refers to transmission of N CSI-RS resources. Once activated, a CSI-RS resource remains activated until released, with the released resource returning to the active set, for example. Uplink grants and/or MAC CEs may be used as mechanisms in the activation/release stage (other alternatives have not been precluded). The maximum value of N (or the value of N), as well as how to signal N are for future study.

According to an example embodiment, in order to further reduce CSI-RS overhead, techniques utilizing frequency domain density reduction are provided. CSI-RS overhead in class B transmissions may be reduced using frequency domain density reduction. As an example, in the frequency domain, the CSI-RS is transmitted every L PRBs, where L may be 1, 2, or greater than 2. In order to support efficient operation with frequency domain density reduction, a frequency domain density reduction rate M and a frequency shift index relative to a starting PRB may be indicated to the UE to allow for the correct detection of the CSI-RS. The frequency shift index indicates a number of frequency resources (relative to a starting PRB) to a first CSI-RS resource, for example. It is noted that if the frequency domain density reduction rate M and the frequency shift index are not provided to the UE, the UE may use techniques such as blind detection to detect the CSI-RS. It is also noted that for both aperiodic and multi-shot CSI-RS, a different frequency domain density reduction rate M and a different frequency shift index may be configured for different CSI-RS resources to enable flexible scheduling.

Figure 3:
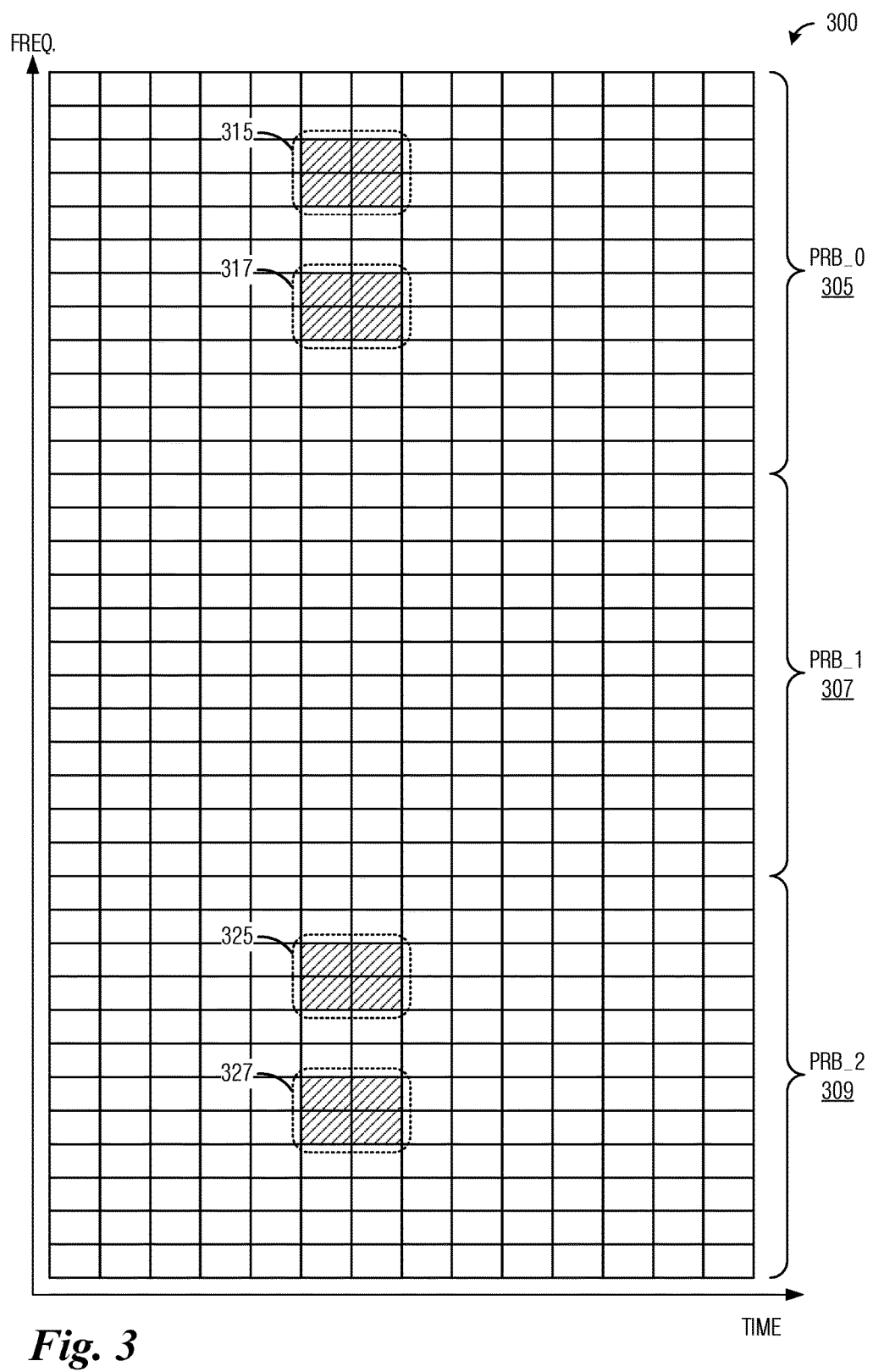
FIG. 3 illustrates a diagram of REs of three consecutive PRBs, highlighting an example CSI-RS design utilizing frequency domain density reduction according to example embodiments described herein.

FIG. 3 illustrates a diagram 300 of REs of three consecutive PRBs, highlighting an example CSI-RS design utilizing frequency domain density reduction. Diagram 300 displays three PRBs 305, 307, and 309. As shown in FIG. 3, some of the REs (RE groups 315 and 317) of PRB_0 305 are allocated as CSI-RS resources. Similarly, RE groups 325 and 327 of PRB_2 309 are allocated as CSI-RS resources, while PRB_1 307 does not have any REs allocated as CSI-RS resources. As shown in FIG. 3, the CSI-RSs are transmitted every L=1 PRBs. In other words, the CSI-RSs are transmitted every other PRB.

According to an example embodiment, the signaling of the frequency domain density reduction rate M and the frequency shift index may be signaled in a variety of occasions. As an illustrative example, the frequency domain density reduction rate M and the frequency shift index may be signaled in Step 1 of the two-step CSI-RS configuration process, Step 2 of the two-step CSI-RS configuration process, or using DCI signaling. Furthermore, the frequency domain density reduction rate M and the frequency shift index may be signaled in different occasions. In other words, the frequency domain density reduction rate M and the frequency shift index do not have to be signaled at the same time.

In a first example embodiment, the frequency domain density reduction rate M is signaled in Step 1 of the two-step CSI-RS configuration process. As an example, the frequency domain density reduction rate M is configured for each of the K CSI-RS resources in an active set. As another example, the same frequency domain density reduction rate M is configured for all K CSI-RS resources in an active set. As yet another example, a different frequency domain density reduction rate M is configured for different subsets of the K CSI-RS resources in an active set.

In a second example embodiment, the frequency shift index is signaled in Step 1 of the two-step CSI-RS configuration process. As an example, the frequency shift index is configured for each of the K CSI-RS resources in an active set. As another example, the same frequency shift index is configured for all K CSI-RS resources in an active set. As yet another example, a different frequency shift index is configured for different subsets of the K CSI-RS resources in an active set. It is noted that for frequency shifts, a starting PRB may be fixed at an orthogonal frequency division multiplexed (OFDM) symbol full band boundary or at a scheduled resource block frequency boundary for each UE.

According to an example embodiment, a frequency domain density reduction rate indicator is provided to reduce the overhead associated with indicating the frequency domain density reduction rate. The frequency domain density reduction rate indicator may be in the form of an index into a table (or some other similar data arrangement). FIG. 4 illustrates an example table 400 of frequency domain density reduction rate information. Table 400 includes a frequency domain density reduction rate indication 405 and associated CSI-RS transmission frequency 410. As an illustrative example, an indicator of 1 indicates that every other PRB conveys the CSI-RS, while an indicator of 0 indicates that every PRB conveys the CSI-RS.

In a third example embodiment, the frequency domain density reduction rate M is signaled in Step 2 of the two-step CSI-RS configuration process. Signaling the frequency domain density reduction rate M in Step 2 may be similar to the signaling of the frequency domain density reduction rate M in Step 1 with exception that only information related to the N activated CSI-RS resources need to be signaled. As an example, the frequency domain density reduction rate M is configured for each of the N activated CSI-RS resources. As another example, the same frequency domain density reduction rate M is configured for all N activated CSI-RS resources. As yet another example, a different frequency domain density reduction rate M is configured for different subsets of the N activated CSI-RS resources. As above, a frequency domain density reduction indicator may be used to reduce the overhead associated with indicating the frequency domain density reduction.

In a fourth example embodiment, the frequency shift index is signaled in Step 2 of the two-step CSI-RS configuration process. Signaling the frequency shift index in Step 2 may be similar to the signaling of the frequency shift index in Step 1 with exception that only information related to the N activated CSI-RS resources need to be signaled. As an example, the frequency shift index is configured for each of the K CSI-RS resources in an active set. As another example, the same frequency shift index is configured for all K CSI-RS resources in an active set. As yet another example, a different frequency shift index is configured for different subsets of the K CSI-RS resources in an active set. It is noted that for frequency shifts, a starting PRB may be fixed at an OFDM symbol full band boundary or at a scheduled resource block frequency boundary for each UE.

In a fifth example embodiment, the frequency domain density reduction rate M and/or the frequency shift index are signaled to the UE using an uplink-related DCI. As an example, the frequency domain density reduction rate M and/or the frequency shift index are signaled to the UE with a CSI-RS resource index. It is noted that this example embodiment may be applicable to aperiodic CSI-RS, where one out of N CSI-RS resources is selected using the uplink-related DCI. The same CSI-RS configuration may be reused for UEs in different situations, allowing for different frequency densities. This technique may be operable in combination with the previously disclosed example embodiments. In other words, the frequency domain density reduction rate M and/or the frequency shift index indicated in the uplink-related DCI may supersede the frequency domain density reduction rate M and/or the frequency shift index signaled in either Step 1 or Step 2 (i.e., the previously disclosed example embodiments).

The example embodiments presented herein may be used jointly for flexible CSI-RS scheduling. As an example, if all five example embodiments are deployed, the frequency domain density reduction rate M and/or the frequency shift index signaled in the fifth example embodiment may supersede the frequency domain density reduction rate M and/or the frequency shift index signaled in the third and fourth example embodiments, and the frequency domain density reduction rate M and/or the frequency shift index signaled in the third and fourth example embodiments may supersede the frequency domain density reduction rate M and/or the frequency shift index signaled in the first and second example embodiments.

According to an example embodiment, the frequency domain density reduction rate M and the frequency shift index are signaled in different steps. Various combinations of the example embodiments presented herein may be selected. As an example, the frequency domain density reduction rate M is signaled using one of the techniques in Step 1, while the frequency shift index is signaled using one of the techniques in Step 2. As another example, the frequency shift index is signaled using one of the techniques in Step 1, while the frequency domain density reduction rate M is signaled using one of the techniques in Step 2. The two examples presented herein are intended as illustrative examples only. Other combinations and orderings for signaling the frequency domain density reduction rate M and the frequency shift index are possible.

Figures 5, 6:
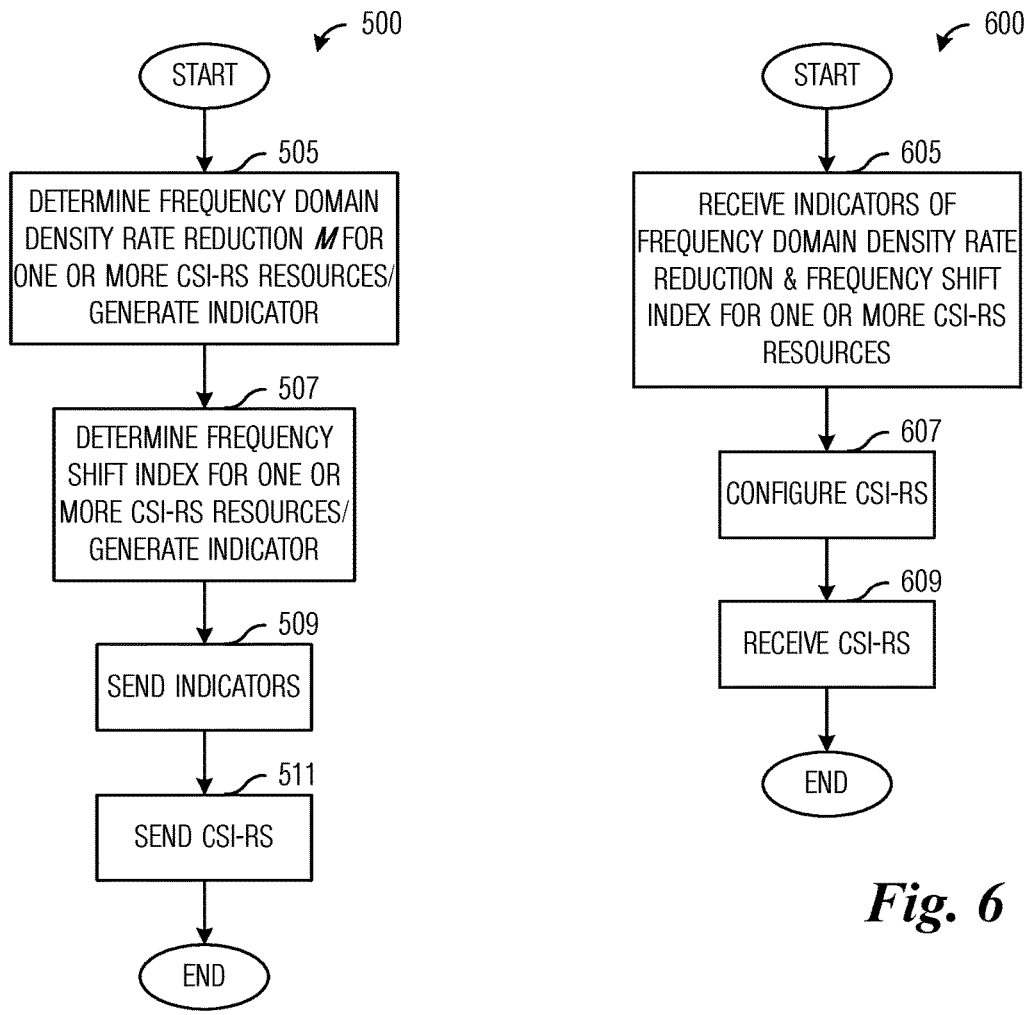
FIG. 5 illustrates a flow diagram of example operations occurring in an access node sending CSI-RSs with frequency domain density reduction according to example embodiments described herein.
FIG. 6 illustrates a flow diagram of example operations occurring in a UE receiving CSI-RSs with frequency domain density reduction according to example embodiments described herein.

FIG. 5 illustrates a flow diagram of example operations 500 occurring in an access node sending CSI-RSs with frequency domain density reduction. Operations 500 may be indicative of operations occurring in an access node as the access node sends CSI-RSs with frequency domain density reduction.

Operations 500 begin with the access node determining the frequency domain density reduction rate M for one or more CSI-RS resources, and generating an indicator therefor (block 505). The access node determines the frequency shift index for the one or more CSI-RS resources, and generates an indicator therefor (block 507). The access node sends the indicators to UEs (block 509). The access node sends the CSI-RS in accordance with the frequency domain density reduction rate M and the frequency shift index (block 511).

FIG. 6 illustrates a flow diagram of example operations 600 occurring in a UE receiving CSI-RSs with frequency domain density reduction. Operations 600 may be indicative of operations occurring in a UE as the UE receives CSI-RSs with frequency domain density reduction.

Operations 600 begin with the UE receiving indicators of the frequency domain density reduction rate M for one or more CSI-RS resources and the frequency shift index for the one or more CSI-RS resources (block 605). The UE configures the CSI-RS (block 607). The UE receives the CSI-RS in accordance with the frequency domain density reduction rate M and the frequency shift index (block 609).

Figure 7:
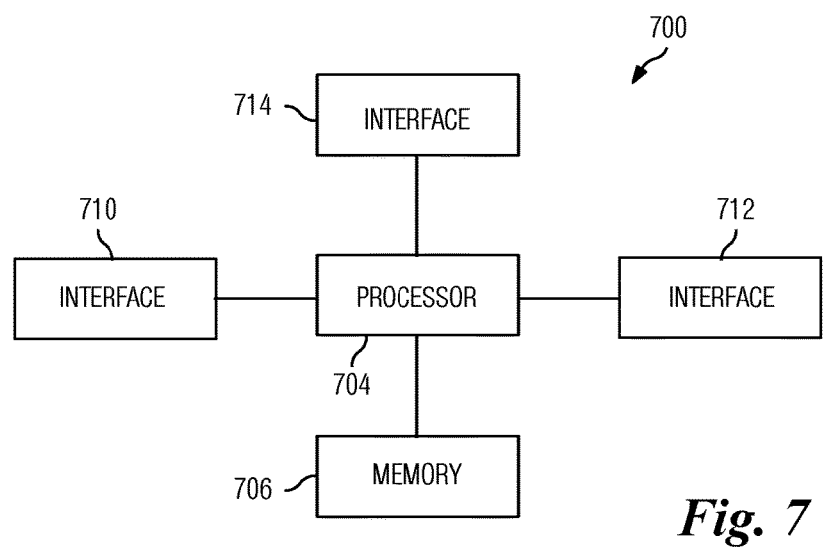
FIG. 7 illustrates a block diagram of an embodiment processing system for performing methods described herein, which may be installed in a host device according to example embodiments described herein.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in the figure. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in the figure, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
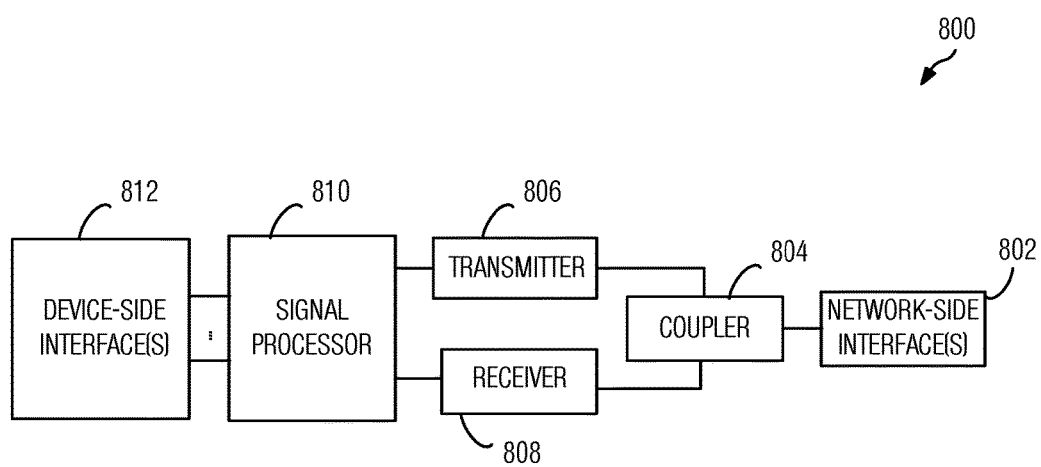
FIG. 8 illustrates a block diagram of a transceiver adapted to transmit and receive signaling over a telecommunications network according to example embodiments described herein.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 9:
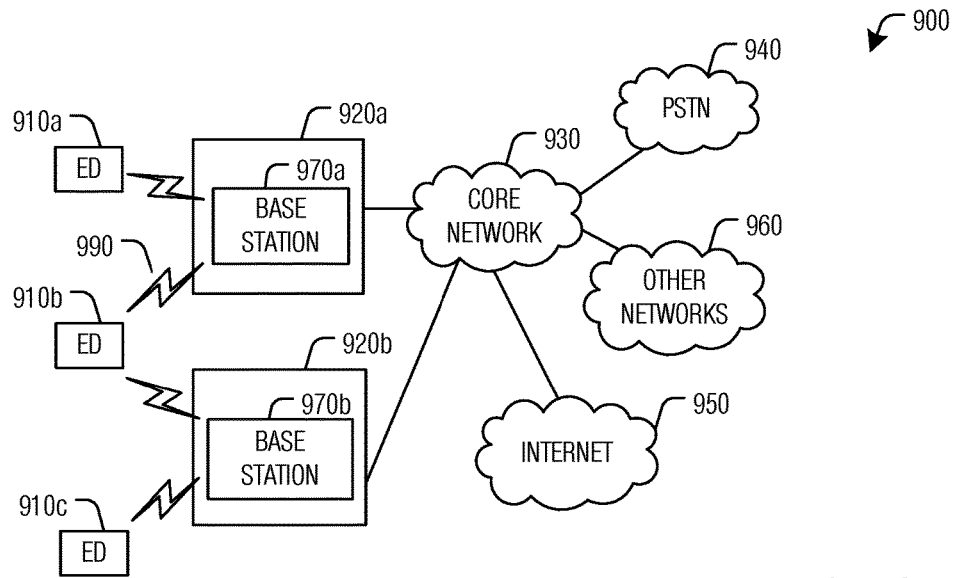
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910*a*-910*c* are configured to operate and/or communicate in the system 900. For example, the EDs 910*a*-910*c* are configured to transmit and/or receive via wireless or wired communication channels. Each ED 910*a*-910*c* represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 920*a*-920*b* here include base stations 970*a*-970*b*, respectively. Each base station 970*a*-970*b* is configured to wirelessly interface with one or more of the EDs 910*a*-910*c* to enable access to the core network 930, the PSTN 940, the Internet 950, and/or the other networks 960. For example, the base stations 970*a*-970*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 910*a*-910*c* are configured to interface and communicate with the Internet 950 and may access the core network 930, the PSTN 940, and/or the other networks 960.

In the embodiment shown in FIG. 9, the base station 970*a* forms part of the RAN 920*a*, which may include other base stations, elements, and/or devices. Also, the base station 970*b* forms part of the RAN 920*b*, which may include other base stations, elements, and/or devices. Each base station 970*a*-970*b* operates to transmit and/or receive wireless signals within a particular geographic region or area, sometimes referred to as a "cell." In some embodiments, multiple-input multiple-output (MIMO) technology may be employed having multiple transceivers for each cell.

The base stations 970*a*-970*b* communicate with one or more of the EDs 910*a*-910*c* over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 920*a*-920*b* are in communication with the core network 930 to provide the EDs 910*a*-910*c* with voice, data, application, Voice over Internet Protocol (VoIP), or other services. Understandably, the RANs 920*a*-920*b* and/or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910*a*-910*c* may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
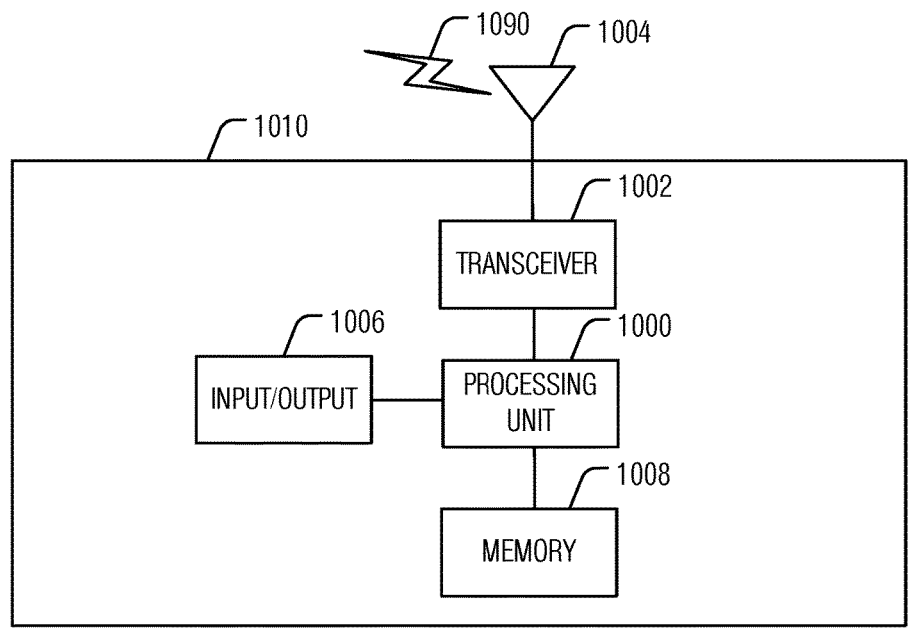
FIGS. 10A and 10B illustrate example devices that may implement the methods and teachings according to this disclosure according to example embodiments described herein.
Figure 10B:
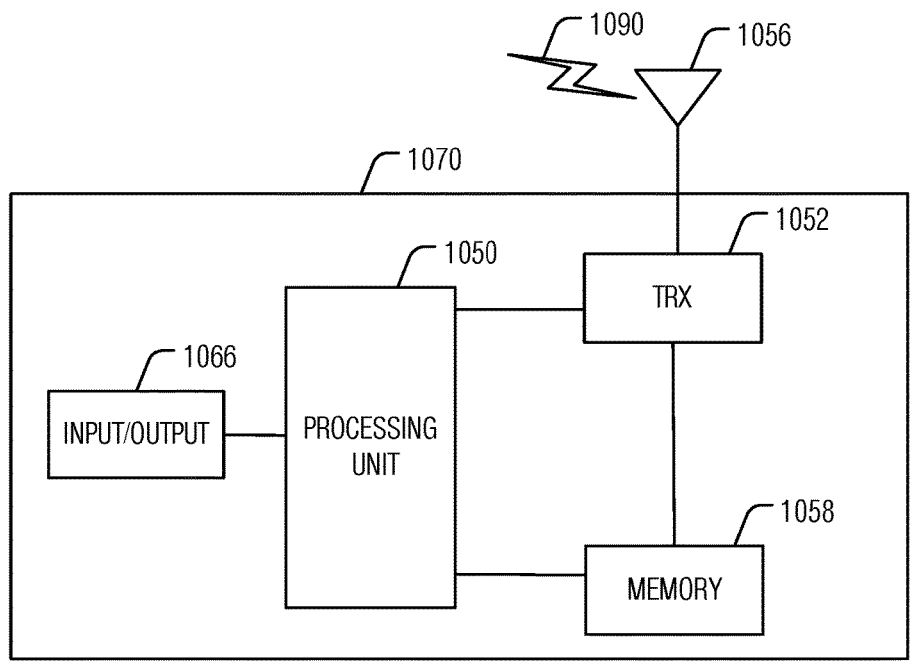

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission and/or processing signals received wirelessly or by wire. Each antenna 1004 includes any suitable structure for transmitting and/or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving/providing information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting and/or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile and/or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
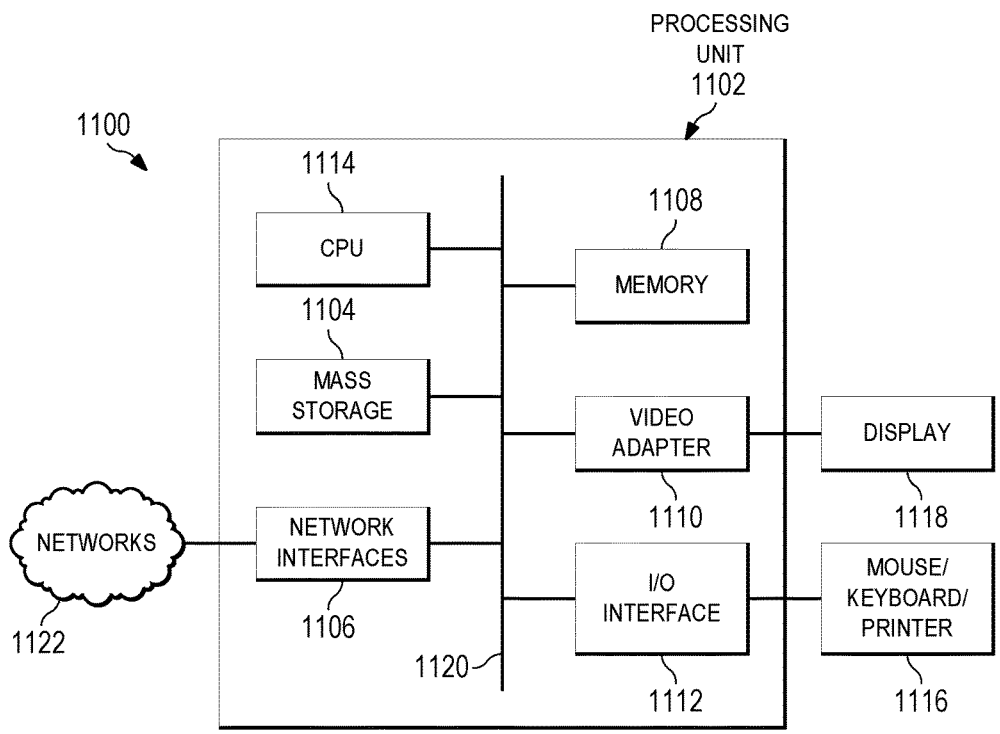
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse/keyboard/printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, and/or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuring unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating an access node, the method comprising:
sending, by the access node to a user equipment (UE), during a radio resource control (RRC) configuration stage of a channel state indicator reference signal (CSI-RS) resource configuration process, a frequency domain density reduction rate parameter and a frequency shift index parameter for one or more CSI-RS resources,
the frequency domain density reduction rate parameter indicating a number of physical resource blocks (PRBs) skipped between successive CSI-RS transmissions and the frequency shift index parameter indicating a shift of a CSI-RS starting PRB, and
the frequency domain density reduction rate parameter and the frequency shift index parameter being configured for each CSI-RS resource in an active set of CSI-RS resources.

2. The method of claim 1, wherein a distinct frequency domain density reduction rate parameter and a distinct frequency shift index parameter are configured for the each CSI-RS resource in the active set of CSI-RS resources.

3. The method of claim 1, wherein a distinct frequency domain density reduction rate parameter and a distinct frequency shift index parameter are configured for each subset of CSI-RS resources in the active set of CSI-RS resources.

4. The method of claim 1, wherein the frequency shift index parameter is relative to a first PRB of scheduled downlink resource blocks for the UE.

5. The method of claim 1, wherein the frequency shift index parameter is relative to a full band boundary.

6. A method for operating a user equipment (UE), the method comprising:
   receiving, by the UE from an access node, during a radio resource control (RRC) configuration stage of a channel state indicator reference signal (CSI-RS) resource configuration process, a frequency domain density reduction rate parameter and a frequency shift index parameter for one or more channel state indicator reference signal (CSI-RS) resources,
   the frequency domain density reduction rate parameter indicating a number of physical resource blocks (PRBs) skipped between successive CSI-RS transmissions and the frequency shift index parameter indicating a shift of a CSI-RS starting PRB, and
   the frequency domain density reduction rate parameter and the frequency shift index parameter being configured for each CSI-RS resource in an active set of CSI-RS resources; and
   sending, by the UE, one or more CSI-RSs in accordance with the frequency domain density reduction rate parameter and the frequency shift index parameter.

7. The method of claim 6, wherein a distinct frequency domain density reduction rate parameter and a distinct frequency shift index parameter are configured for the each CSI-RS resource in the active set of CSI-RS resources.

8. The method of claim 6, wherein a distinct frequency domain density reduction rate parameter and a distinct frequency shift index parameter are configured for each subset of CSI-RS resources in the active set of CSI-RS resources.

9. An access node comprising:
   a non-transitory memory storage comprising instructions; and
   one or more processors in communication with the non-transitory memory storage, wherein the one or more processors execute the instructions to:
      send, to a user equipment (UE), during a radio resource control (RRC) configuration stage of a channel state indicator reference signal (CSI-RS) resource configuration process, a frequency domain density reduction rate parameter and a frequency shift index parameter for one or more CSI-RS resources,
      wherein the frequency domain density reduction rate parameter indicates a number of physical resource blocks (PRBs) skipped between successive CSI-RS transmissions and the frequency shift index parameter indicates a shift of a CSI-RS starting PRB, and
      wherein the frequency domain density reduction rate parameter and the frequency shift index parameter are configured for each CSI-RS resource in an active set of CSI-RS resources.

10. The access node of claim 9, wherein a distinct frequency domain density reduction rate parameter and a distinct frequency shift index parameter are configured for the each CSI-RS resource in the active set of CSI-RS resources.

11. The access node of claim 9, wherein a distinct frequency domain density reduction rate parameter and a distinct frequency shift index parameter are configured for each subset of CSI-RS resources in the active set of CSI-RS resources.

12. The access node of claim 9, wherein the frequency shift index parameter is relative to a first PRB of scheduled downlink resource blocks for the UE.

13. The access node of claim 9, wherein the frequency shift index parameter is relative to a full band boundary.

14. The method of claim 6, wherein the frequency shift index parameter is relative to a first PRB of scheduled downlink resource blocks for the UE.

15. The method of claim 6, wherein the frequency shift index parameter is relative to a full band boundary.

16. A user equipment (UE) comprising:
   a non-transitory memory storage comprising instructions; and
   one or more processors in communication with the non-transitory memory storage, wherein the one or more processors execute the instructions to:
      receive, during a radio resource control (RRC) configuration stage of a channel state indicator reference signal (CSI-RS) resource configuration process, a frequency domain density reduction rate parameter and a frequency shift index parameter for one or more channel state indicator reference signal (CSI-RS) resources,
      wherein the frequency domain density reduction rate parameter indicates a number of physical resource blocks (PRBs) skipped between successive CSI-RS transmissions and the frequency shift index parameter indicates a shift of a CSI-RS starting PRB, and
      wherein the frequency domain density reduction rate parameter and the frequency shift index parameter are configured for each CSI-RS resource in an active set of CSI-RS resources, and
      send one or more CSI-RSs in accordance with the frequency domain density reduction rate parameter and the frequency shift index parameter.

17. The UE of claim 16, wherein a distinct frequency domain density reduction rate parameter and a distinct frequency shift index parameter are configured for the each CSI-RS resource in the active set of CSI-RS resources.

18. The UE of claim 16, wherein a distinct frequency domain density reduction rate parameter and a distinct frequency shift index parameter are configured for each subset of CSI-RS resources in the active set of CSI-RS resources.

19. The UE of claim 16, wherein the frequency shift index parameter is relative to a first PRB of scheduled downlink resource blocks for the UE.

20. The UE of claim 16, wherein the frequency shift index parameter is relative to a full band boundary.

* * * * *